(12) United States Patent
Ross

(10) Patent No.: US 7,603,315 B2
(45) Date of Patent: Oct. 13, 2009

(54) SELF-SERVICE TERMINAL

(75) Inventor: Ian Ross, Dundee (GB)

(73) Assignee: NCR Corporation, Dayton, OH (US)

( * ) Notice: Subject to any disclaimer, the term of this patent is extended or adjusted under 35 U.S.C. 154(b) by 2124 days.

(21) Appl. No.: 09/966,023

(22) Filed: Sep. 28, 2001

(65) Prior Publication Data

US 2002/0046057 A1 Apr. 18, 2002

(30) Foreign Application Priority Data

Oct. 17, 2000 (GB) ................................ 0025367.4

(51) Int. Cl.
*G06Q 40/00* (2006.01)
(52) U.S. Cl. .............................. 705/43; 705/35; 705/38; 705/39; 705/40; 705/42; 705/44; 705/26; 235/379; 707/202
(58) Field of Classification Search .................... 705/39, 705/43
See application file for complete search history.

(56) References Cited

U.S. PATENT DOCUMENTS 6,009,408 A 12/1999 Buchanan

2003/0033246 A1 * 2/2003 Slater .......................... 705/39

OTHER PUBLICATIONS

"PNC bank Named Preferred Provider of Financial Services to Pitt Students" PR Newswire (from Proquest) Aug. 24, 2000 (3 pages attached).*
"A Nonprofit Association Debuts a "Safe" Card for Students" Credit Card News, Aug 15, 2000, p. 6 (1 page attached).*

* cited by examiner

*Primary Examiner*—Kirsten S Apple
(74) *Attorney, Agent, or Firm*—Gregory A. Welte

(57) ABSTRACT

A self-service terminal (14) is described The terminal is associated with an organization (18) having individuals (36) under its supervision, each individual having a sponsor, whereby the terminal provides the individuals with access to financial services provided by a financial institution in accordance with rules established by the sponsor and the organization. A method of providing financial transactions via a self-service terminal (14) is also described, the method comprising the steps of: maintaining a financial account for an organization, providing a self-service terminal in premises used by the organization, maintaining a financial account for an individual under the supervision of the organization, allowing a sponsor and/or the organization to establish rules governing use of the financial account by the individual, and only fulfilling a transaction requested by the individual at the terminal if the transaction is consistent with the established rules for that individual.

3 Claims, 5 Drawing Sheets

SELF-SERVICE TERMINAL

BACKGROUND OF THE INVENTION

The present invention relates to a self-service terminal (SST), in particular to an SST associated with an organization having individuals under its supervision, such as a school, a hospital, a prison, or such like. The invention also relates to a method of providing financial transactions via a self-service terminal associated with an organization having individuals under its supervision.

Many organizations having individuals under their supervision or in their care offer additional products and services for purchase by these individuals. For example, schools typically offer summer trips for their pupils, school meals, books, stationery, confectionary, and such like.

For the example of a school offering products and services, this requires parents/guardians to give money to the schoolchildren for purchasing these items. This gives rise to the problem of children losing the money or the money being stolen by another child. Another problem is that the child may use the money to purchase items other than those items for which the money was intended.

Yet another problem is that this requires the organization to maintain accounts for the money received from the individuals in its care. Thus, a school has to perform an accounting function which may occupy teachers' time and divert them from the primary role of teaching pupils.

Similar problems exist in other organizations such as hospitals and prisons.

SUMMARY OF THE INVENTION

It is among the objects of an embodiment of the present invention to obviate or mitigate one or more of the above disadvantages, or other disadvantages associated with providing products and/or services to individuals under the supervision of an organization.

According to a first aspect of the present invention there is provided a self-service terminal associated with an organization having individuals under its supervision, each individual having a sponsor, whereby the terminal provides the individuals with access to financial services provided by a financial institution in accordance with rules established by the sponsor and the organization.

By virtue of this aspect of the invention, an organization such as a school is able to use a financial institution for performing the financial aspects of a transaction, this reduces the accounting function that has to be performed by the organization; in effect, a school is able to outsource the accounting and transaction functions.

Another advantage of this aspect of the invention is that a sponsor (such as a parent) is able to determine how much funds are available to an individual, when these funds are available, and such like. This reduces the possibility of the individual losing money or theft of the money from the individual.

Yet another advantage of this aspect of the invention is that the financial institution is able to develop a banking relationship with the individual, even if the individual is not able to have an account in his/her own name. Where the individual is a pupil, this may encourage the pupil to open an account with that financial institution when the pupil completes school education.

The individuals may be schoolchildren, students, patients, prisoners, or such like.

Where the individuals are students the organization may be a university or college and the sponsor may be a parent of the student; where the individuals are patients the organization may be a hospital or medical center and the sponsor may be a relative or friend of the patient; where the individuals are prisoners the organization may be a prison and the sponsor may be a relative or friend of the prisoner.

In a preferred embodiment, the individuals are schoolchildren, the organization is a school, and the sponsor is a parent.

Preferably, the terminal is located in premises used by the organization

Preferably, the terminal allows individuals to purchase products and/or services offered by the organization to individuals under its supervision. For example, a pupil may be able to purchase a school meal ticket at the terminal using funds from an account associated with the individual but controlled by the individual's sponsor (such as a parent).

In a preferred embodiment the terminal is an automated teller machine (ATM).

The organization may establish rules relating to when the account may be accessed. For example, the account may only be accessed at certain times during the day. The organization may also decide the maximum transaction value in a day, for example ten pounds sterling.

According to a second aspect of the present invention there is provided a method of providing financial transactions via a self-service terminal associated with an organization having individuals under its supervision, the method comprising the steps of: maintaining a financial account for the organization, providing a self-service terminal in premises used by the organization, maintaining a financial account for an individual under the supervision of the organization, allowing a sponsor and/or the organization to establish rules governing use of the financial account by the individual, and only fulfilling a transaction requested by the individual at the terminal if the transaction is consistent with the established rules for that individual.

The method may include the further step of offering the individual products and/or services provided by the organization.

According to a third aspect of the present invention there is provided a financial transaction system comprising a self-service terminal in communication with a transaction host, where the terminal is associated with an organization having individuals under its supervision, and whereby the system: maintains a financial account for an individual under the supervision of the organization, allows a sponsor and/or the organization to establish rules governing use of the financial account by the individual, and only fulfils a transaction requested by the individual at the terminal if the transaction is consistent with the established rules for that individual.

According to a fourth aspect of the present invention there is provided a method of administering financial accounts for individuals under the supervision of an organization, where each individual has a sponsor, the method comprising the steps of: providing a financial account for an individual, allowing the individual's sponsor to control the account, allowing the individual to purchase products and/or services offered by the organization using the financial account, and providing the organization with a fee associated with purchases made using the account.

The fee may be on a per purchase basis, or it may be a fixed fee for a predetermined time period.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
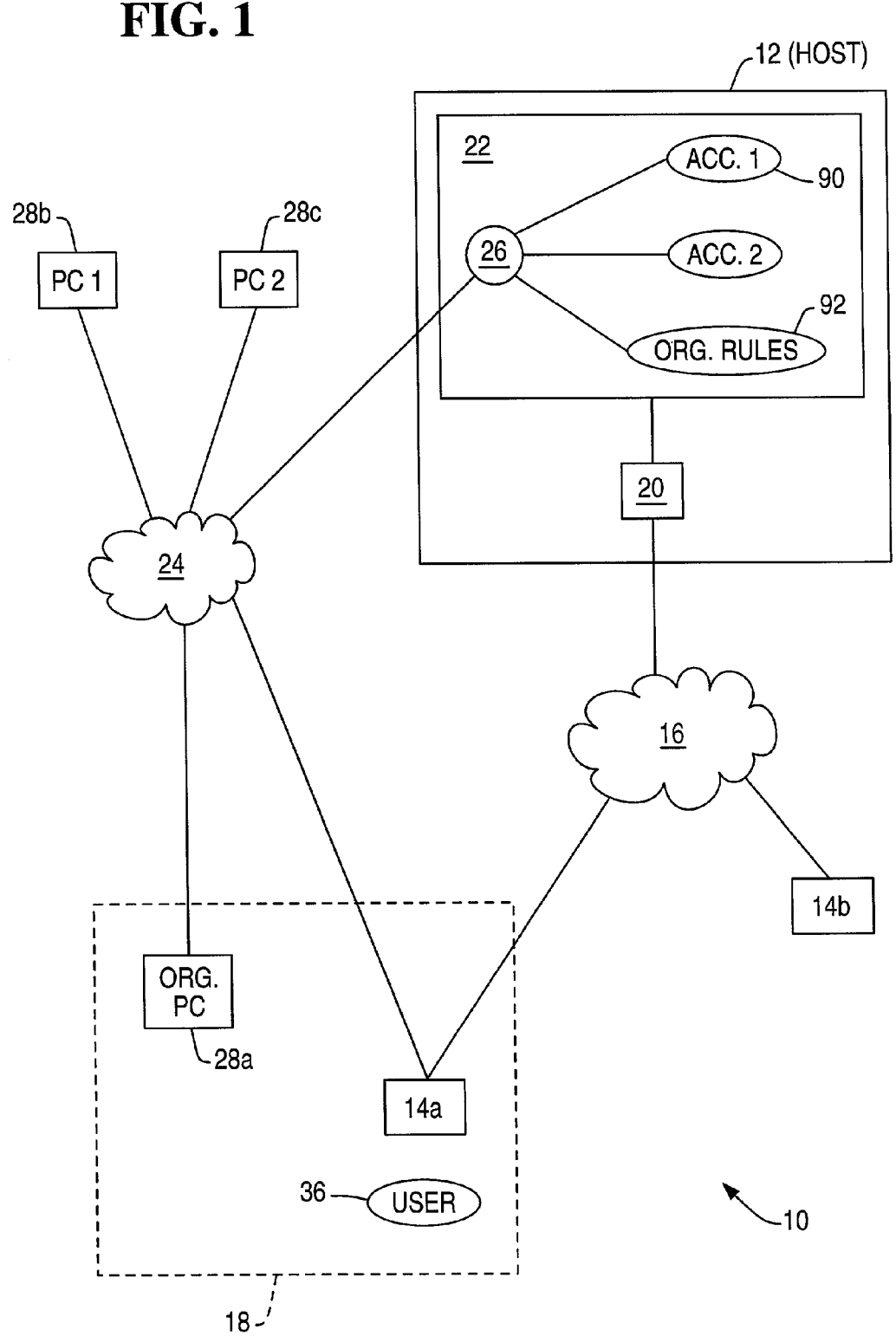
FIG. 1 is a block diagram illustrating a system according to one embodiment of the present invention.

Referring now to FIG. 1, which is a block diagram of a self-service terminal system 10 in accordance with one embodiment of the present invention, the system 10 comprises a host (server) 12 interconnected to a plurality of SSTs 14 (only two are shown) by a secure private network 16. The SSTs 14 are in the form of ATMs. One of the ATMs 14a is located within a school (illustrated by block 18). The ATMs 14 are physically remote from each other, but are shown in proximity in FIG. 1 for clarity.

The host 12 is owned and operated by a financial institution and includes an authorization facility 20 and a back-office facility 22. As is well known in the art, the authorization facility 20 authorizes transactions received from the ATMs 14.

The back-office facility 22 includes details of bank accounts held by customers of the financial institution and stores information relating to transactions executed at the ATMs 14. The back-office facility 22 is also connected to a public network 24, in this embodiment the Internet, and includes a Web server component 26 accessible from Web browser terminals 28, such as personal computers (PCs). As is well known, a large number of Web browsers have access to the World Wide Web facility on the Internet, but for clarity, only three PCs are shown in FIG. 1; one of these PCs 28a is used by an official in the school 18.

Figure 2:
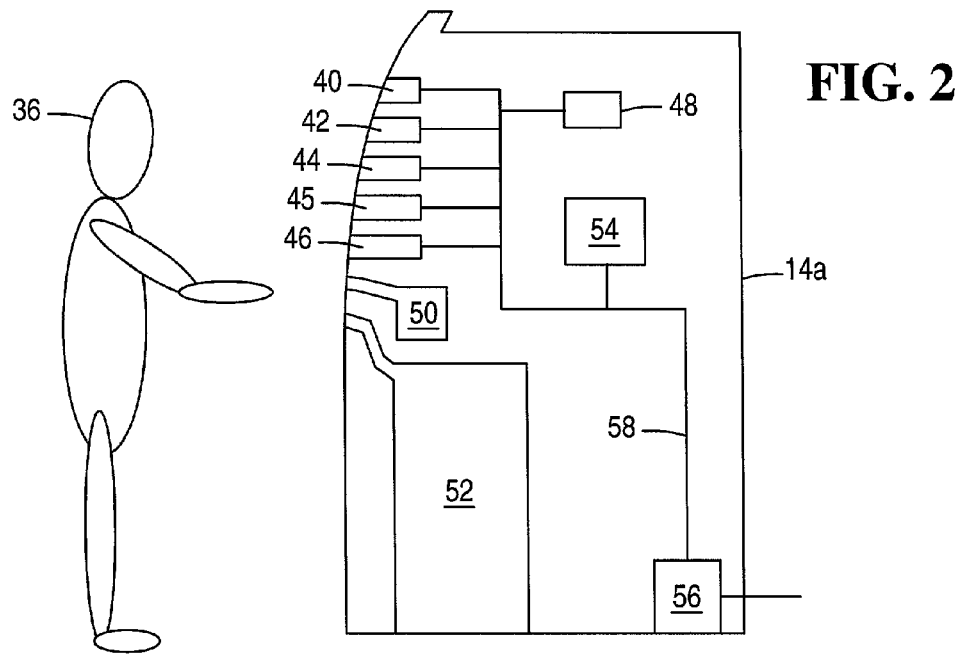
FIG. 2 is a block diagram illustrating a self-service terminal used in the system of FIG. 1.

Reference is now made to FIG. 2, which illustrates a school pupil (a user) 36 operating ATM 14a of FIG. 1, and shows ATM 14a in more detail.

The ATM 14a includes a touchscreen display module 40, a CD (compact disc) reader/writer module 42 including a supply of blank CDs to which data may be written by the module 42, a magnetic card reader/writer (MCRW) module 44, an MP3 module 45 for transferring music in MP3 format, a receipt printer module 46, an internal journal printer module 48, a deposit module 50, a cash dispenser module 52, an ATM controller module 54 for controlling the operation of the various modules, a network connection module 56 for communicating with the host 12 (FIG. 1) via network 16 (FIG. 1) and for accessing Web servers (not shown) via the Internet 24. All of the modules within the ATM 14 are interconnected by an internal bus 58 for conveying data.

Figure 3:
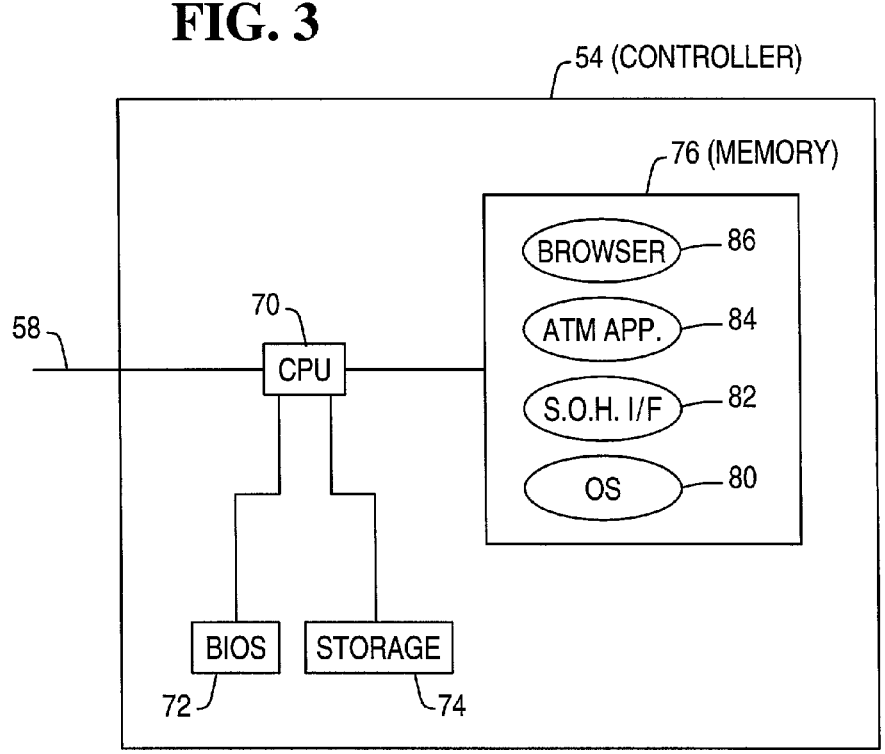
FIG. 3 is a block diagram illustrating a part of the terminal of FIG. 1 (the controller) in more detail.

Reference is now made to FIG. 3, which shows the ATM controller 54 in more detail. Controller 54 comprises a processor 70, a bios 72, storage 74 in the form of a magnetic disk drive, and main memory 76. In use, the processor 70 loads the memory 76 with an operating system kernel 80, a state of health management interface 82, an ATM application 84, and a Web browser 86.

The management interface 82 filters out state of health information received from the modules (40 to 56 in FIG. 2) to monitor the performance of these modules (40 to 56 in FIG. 2) and thereby to detect possible malfunctions. The management interface 82 may also include open system architecture components (such as WOSA and/or WOSA XFS) for providing application interoperability in calling functions relating to the modules (40 to 56 in FIG. 2).

The ATM application 84 includes the application flow (i.e. the series of screens) presented to a user on the ATM display 40. The term "screen" is used herein to denote the graphics, text, controls (such as menu options), and such like, that are displayed on an SST monitor; the term "screen" as used herein does not refer to the hardware (that is, the monitor) that displays the graphics, text, controls, and such like.

The ATM application 84 also includes conventional routines that are required to instruct modules to perform functions, for example, to instruct the cash dispenser 52 to dispense twenty pounds sterling. The ATM application 84 also includes a routine for managing presentation and sale of school products and services, as will be described in more detail below.

Figure 4:
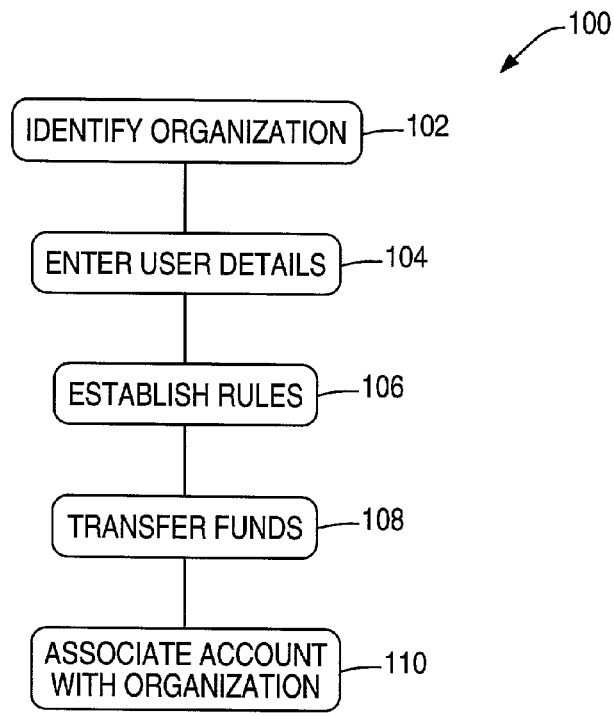
FIG. 4 is a flowchart illustrating the steps involved in creating a financial account for the system of FIG. 1.

Creation of a financial account for a pupil will now be described with reference to FIGS. 1 to 3, and also to FIG. 4, which is a flowchart illustrating the steps involved. The account creation process 100 is initiated by a sponsor (in this embodiment, a pupil's parent) accessing the financial institution's Web server 26 using a Web browser at a home PC 28b.

The sponsor identifies (from a list of names received from the Web server 26) the organization to which the individual belongs (step 102). In this embodiment, the individual is a pupil, and the organization is the school attended by the pupil.

The sponsor inputs details (step 104) about the pupil and about the sponsor. The sponsor may also have to visit the financial institution to provide some form of identification (passport, driving license, or such like).

The sponsor then inputs rules (step 106) controlling transactions that may be performed using that account; for example governing how much money can be withdrawn from the account (such as, five pounds each day), how transactions are to be notified to the sponsor (for example, each transaction may be notified to the sponsor by email).

The sponsor then transfers funds (step 108) to an account that is to be opened.

The financial institution then opens an account (step 110) and an account file 90 (FIG. 1) for that individual and associates the newly opened account and account file 90 with the identified school.

An official at the school (such as a head teacher) establishes rules for any account associated with the school. This is achieved by the official accessing the financial institution's Web server 26 using a Web browser at PC 28a. The official may decide that accounts can only be accessed at certain times (for example, one or more of the following time periods: before the start of the school day, during lunch break, after the school day has finished, before 7 pm, and such like) to avoid use of the ATM during school lessons or after the school day has finished and pupils should have left the vicinity of the school. The official may also decide the maximum transaction value in a day, for example ten pounds sterling. When the official has established the rules, the rules are stored by the Web server 26 as a file 92 (FIG. 1) in the back-office facility 22.

A typical transaction at ATM 14*a* will now be described, with reference to FIGS. 5*a* to 5*e*, which are a series of screens generated by the ATM application 84 and displayed to a user during a transaction.

An initial screen 116 (FIG. 5*a*) presents text 118 welcoming a user to the school's ATM and inviting the user 36 to enter an identification. The identification may be biometrics based, or it may be a token such as a card (magnetic stripe card or Smart card) or an electronic item (such as a Smart ring or Smart button). In this embodiment, the identification is a magnetic stripe card, and the ATM 14*a* requests the user to enter a personal identification number (PIN) to verify his/her claimed identity.

The user 36 is then shown a transaction selection screen 120 (FIG. 5*b*), presenting a cash withdrawal option 122, two school related options (pay for a school meal 124, pay part or all of the cost of a school trip 126), and two non-school related options (download music 128, and surf the World Wide Web 130). Almost all of the screens in the series also include a cancel option 132 to halt the transaction and return the user to the initial screen 116.

It will be appreciated that each transaction presents the user 36 with a different set of screens; in this embodiment, the transaction described is the user 36 selecting the option to pay for a school meal 124.

When the user selects school meal option 124, then ATM 14*a* presents a cost screen 140 (FIG. 5*c*) indicating the cost of the meal in one field 142 (in this example the meal costs two pounds sterling) and providing the user 36 with an accept option 144 for proceeding with the transaction, and the cancel option 132 for halting the transaction.

Figure 5A:
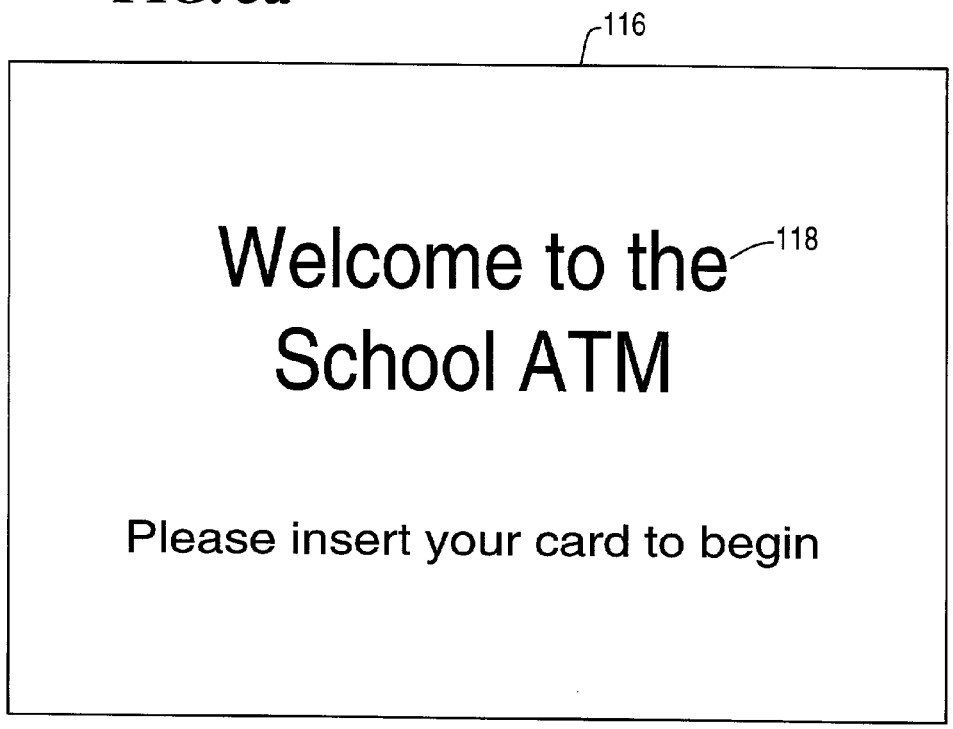
FIGS. 5a to 5e are screens presented to a user during a typical transaction at the terminal of FIG. 2.
Figure 5B:
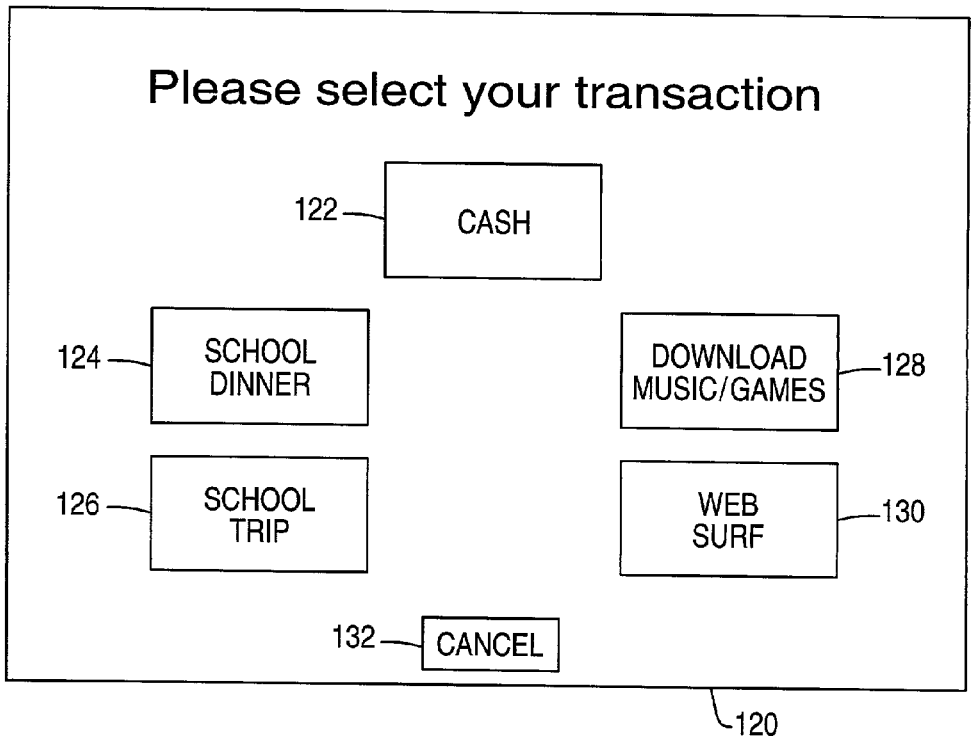
Figure 5C:
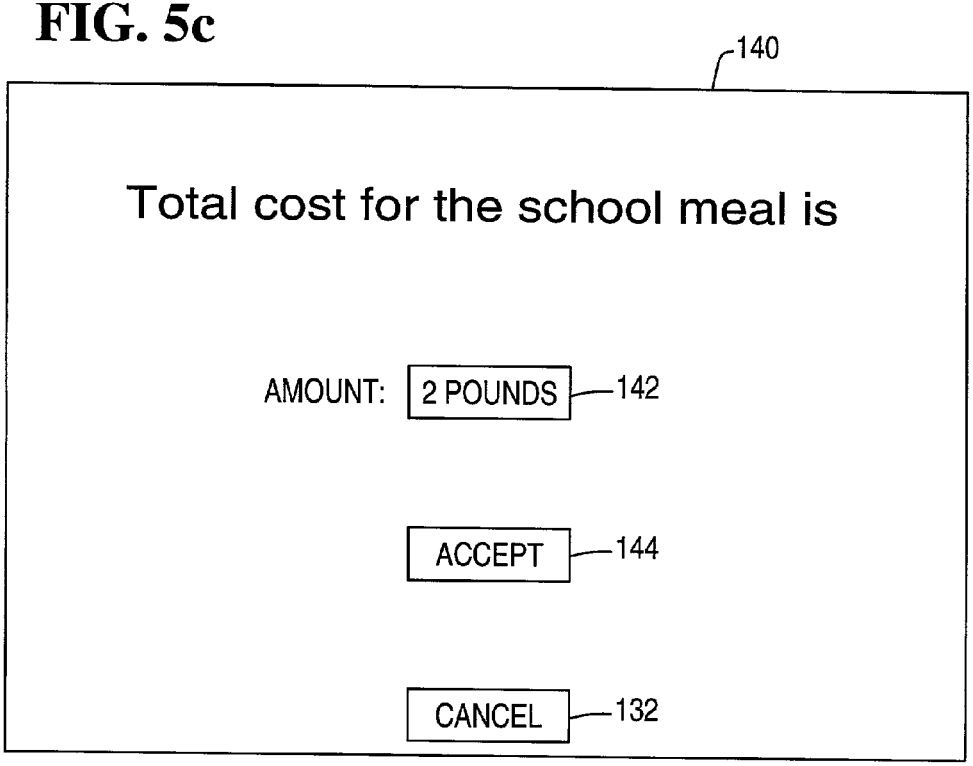
Figure 5D:
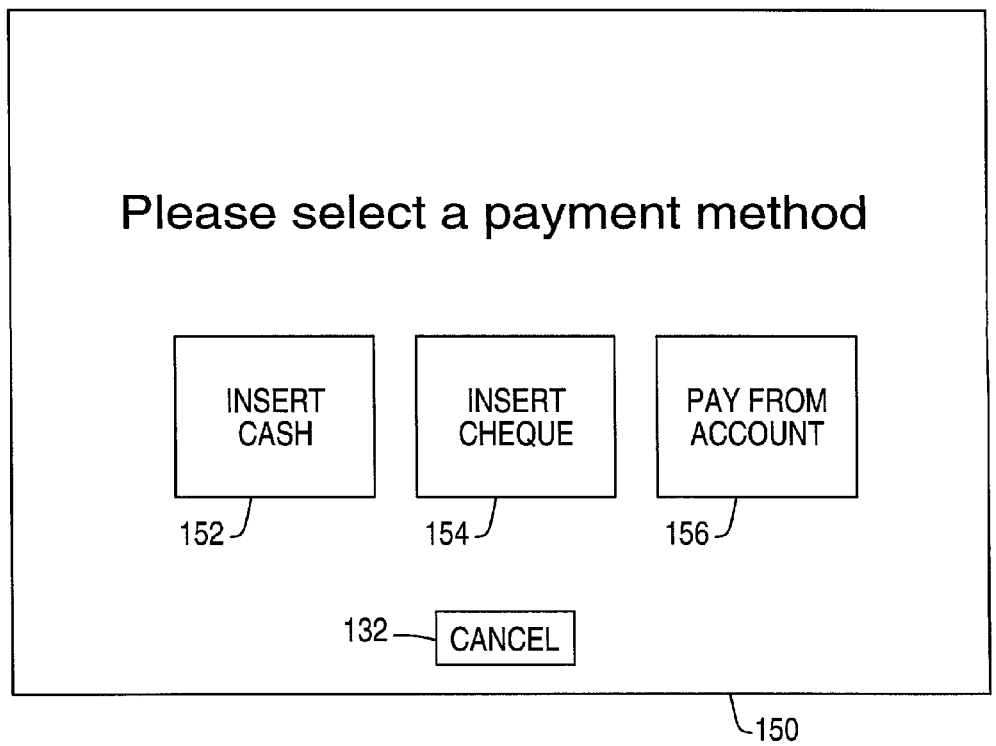
Figure 5E:
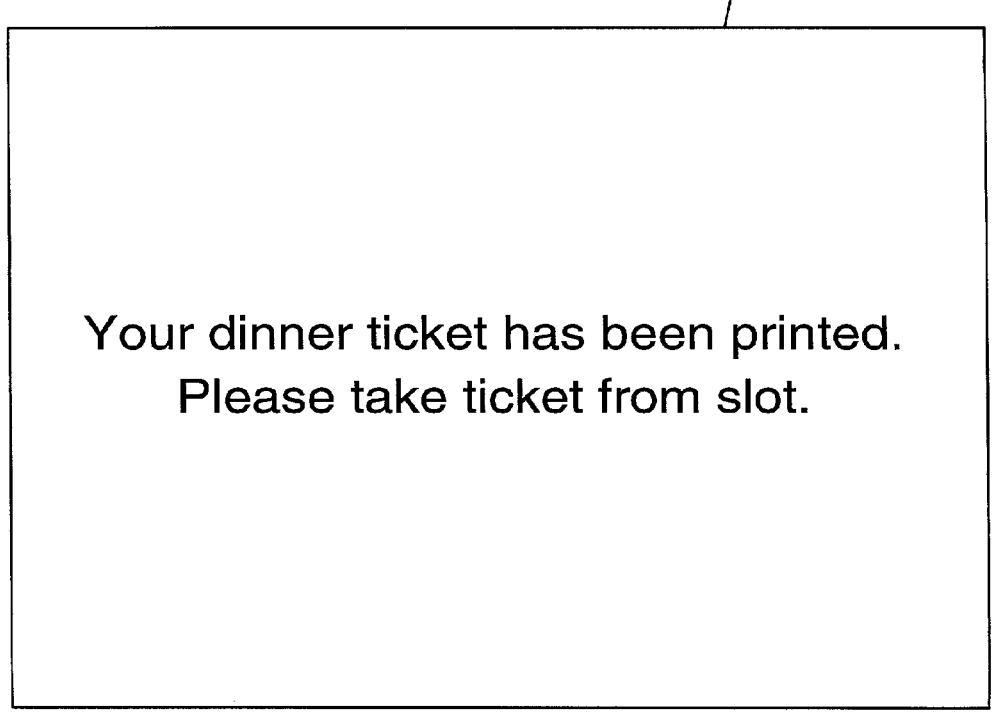

If the user 36 selects the accept option 144, then ATM 14*a* presents a payment method screen 150 (FIG. 5*d*). Payment method screen 150 provides different payment options for the pupil to select, including cash 152, check 154, and direct transfer from the pupil's account 156.

If cash payment 152 is selected then the user 36 is requested to insert banknotes (and/or coins) into the deposit module 50 (FIG. 2). If check payment 154 is selected then the user 36 is requested to insert a check into the deposit module 50 (FIG. 2). In this example, direct funds transfer from the pupil's account (option 146) is selected, and an authorization screen (not shown) is presented to the user 36 indicating that the transaction is being authorized.

The ATM 14*a* sends a transaction authorization request to the host 12 via secure private network 16. When the host receives the request, it accesses the organization rules file 92 and the account and account file 90 (FIG. 1). The host 12 ensures that:

the transaction is consistent with the rules established by the school and recorded in file 92;
funds are available in the account 90;
the PIN and card combination are correct; and
the transaction is consistent with the rules established by the sponsor and stored in account file 90.

If one or more of these criteria are not met, then the host 12 communicates a 'transaction not authorized' message to the ATM 14*a*.

If all of these criteria are met, then the host 12 authorizes the transaction and communicates the authorization to the ATM 14*a* via the private network 16. The ATM 14*a* then prints a school dinner ticket using printer module 46 and requests that the user remove his/her card from the MCRW module 44.

The ATM 14*a* then presents the user with a ticket screen 160 (FIG. 5*e*) inviting the user to remove the printed school dinner ticket from a printer slot (not shown) in the ATM 14*a*.

When the user 36 removes the ticket, the ATM 14*a* presents the initial screen 116.

If the user 36 had selected the download music option 128 (FIG. 5*b*), then the user would have been presented with a series of screens enabling the user to download music from the Internet and to transfer the downloaded music to a CD ROM medium (using the CD reader/writer module 42 and a blank CD ROM stored therein), or to transfer the downloaded music to the user's MP3 player using MP3 module 45. The school may charge an additional fee for this download service.

If the user 36 had selected the Web surfing option 130 (FIG. 5*b*), then the user 36 would have been presented with a series of screens, one of which screens would indicate the payment required for surfing the Web, another screen would comprise a graphical user interface for the Web browser 86 (FIG. 3) to enable the user 36 to navigate through the World Wide Web. The ATM 14*a* may include software to ensure that certain Web sites, or Web sites including certain types of subject matter, may not be accessed by the Web browser 86.

At the end of each day, the financial institution notifies each sponsor of any transactions executed by his/her pupil that day.

It will be appreciated that this embodiment has the advantage that the sponsor is able to provide finds for a pupil in a secure manner, so that the pupil has access to funds in case of emergencies or for paying for school-related products or services. The sponsor is also provided with a record of the transactions executed by the pupil. This enables unbanked individuals to have access to a financial account. Another advantage is that the school is able to automate collection of money from pupils, thereby outsourcing the accounting function, reducing overhead. The school is also able to supply additional services (such as MP3 download, games download, Web surfing, and such like) using the ATM, which may provide the school with a revenue stream. The school may also receive a share of any transaction charge levied for transactions at the ATM.

Various modifications may be made to the above described embodiment within the scope of the invention, for example, products and services different to those described may be offered to users of the ATM.

In other embodiments, the ATM may include additional modules (such as a coin module, a postage stamp dispenser, and such like) so that the ATM is able to provide additional products and/or services.

In other embodiments, the organization may be a hospital, a prison, or such like.

In another embodiment, a sponsor may open an account by accessing the organization's Web server and entering details therein; the organization may then pass these details to a financial institution that performs the financial services for that institution (including creation of accounts, maintenance of accounts, transactions, and such like).

What is claimed is:

1. A method of providing financial transactions via a self-service terminal associated with an organization having individuals under its supervision, the method comprising the steps of:

maintaining a financial account for the organization;
maintaining a financial account for an individual under the supervision of the organization;
allowing a sponsor and/or the organization to establish rules governing use of funds within the financial account by the individual; and
when a transaction is requested by the individual at a self-service terminal located in premises used by the organization, examining by a processor the rules and fulfilling the transaction if the transaction is consistent with the established rules for that individual;

wherein the rules limit times-of-day when specific transactions are allowed.

2. A financial transaction system comprising:
a) a self-service terminal, SST, in communication with a transaction host, wherein the terminal is associated with an organization having individuals under its supervision;
b) means for maintaining a financial account for an individual under the supervision of the organization;
c) means for allowing a sponsor and/or the organization to establish rules governing use of the financial account by the individual, said rules being accessible to the SST or the host; and
d) means for fulfilling a transaction requested by the individual at the terminal if the transaction is consistent with the established rules for that individual;

wherein the rules limit times-of-day when specific transactions are allowed.

3. A financial transaction system comprising:
a) an automated teller machine (ATM) in communication with a transaction host, wherein the ATM is associated with an organization having individuals under its supervision;
b) means for maintaining a financial account for an individual under the supervision of the organization;
c) means for allowing a sponsor and/or the organization to establish rules governing use of the financial account by the individual, said rules being accessible to the ATM or the host; and
d) means for fulfilling a transaction requested by the individual at the ATM if the transaction is consistent with the established rules for that individual;

wherein the rules limit times-of-day when specific transactions are allowed.

* * * * *